No. 646,641. Patented Apr. 3, 1900.
J. FERREL.
VEHICLE BRAKE.
(Application filed June 26, 1899.)
(No Model.) 2 Sheets—Sheet 1.
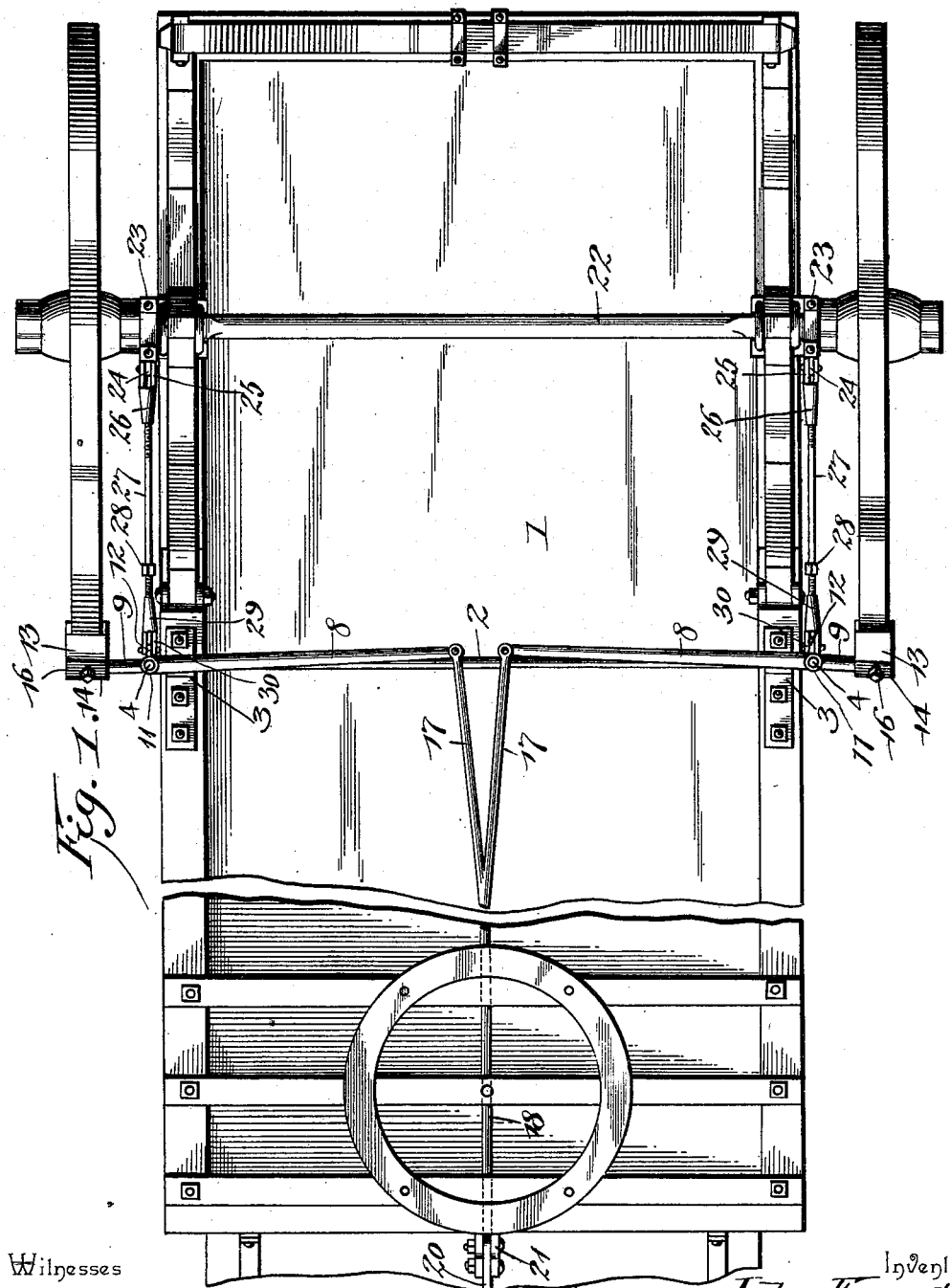
Witnesses
Inventor,
John Ferrel.
By his Attorneys,

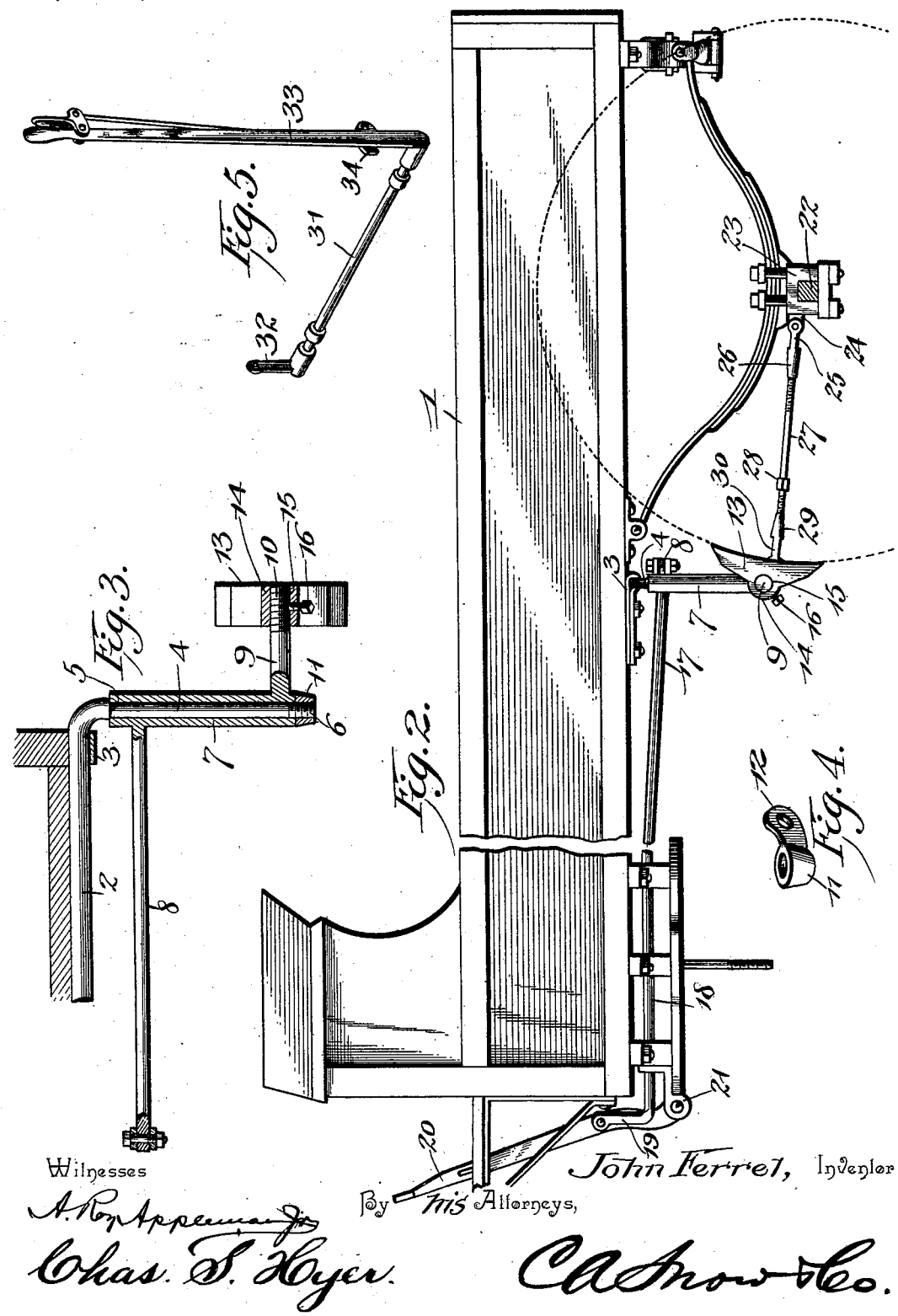

UNITED STATES PATENT OFFICE.

JOHN FERREL, OF ZANESVILLE, OHIO.

VEHICLE-BRAKE.

SPECIFICATION forming part of Letters Patent No. 646,641, dated April 3, 1900.

Application filed June 26, 1899. Serial No. 721,876. (No model.)

*To all whom it may concern:*

Be it known that I, JOHN FERREL, a citizen of the United States, residing at Zanesville, in the county of Muskingum and State of Ohio, have invented a new and useful Vehicle-Brake, of which the following is a specification.

This invention relates to vehicle-brakes; and the object of the same is to render such devices more effective by providing means for constantly maintaining the brake-shoes in invariable radial distances from the centers or hubs of the wheels with which they operate, irrespective of the loaded condition of the vehicle, to compensate for wear of parts by the interposition and application of adjusting devices, which can be easily reached and the adjustment of the same changed without disconnecting any of the parts, and to dispose the brake-shoes in such manner that they will always be brought to bear against the wheel-tire with equal pressure throughout their contacting faces, and thereby avoid unequal wear and a consequent variation in the braking pressure of a portion of the said shoes.

The invention consists, essentially, of a stationary brake-supporting rod extending transversely across the under side of the body of a vehicle and having depending vertical bearing ends on which are rotatably mounted sleeves provided with arms projecting outwardly from the upper and lower portions thereof in opposite directions, one arm of each sleeve being shorter than the other and having a brake-shoe adjustably mounted thereon, the other longer arm being attached to one portion of a brake-operating rod.

The invention further consists of brake-shoes swingingly mounted and movable in a horizontal plane, combined with adjusting-rods attached to portions thereof and also to the axle, to thereby preserve a constant radial distance of the brake-shoes relatively to the wheels with which they operate.

The invention further consists of the details of construction and arrangement of the several parts, which will be more fully hereinafter described and claimed.

In the accompanying drawings, Figure 1 is a bottom plan view of a portion of a vehicle, showing the improved brake applied thereto. Fig. 2 is a side elevation of a part of a vehicle, illustrating the improved brake mechanism. Fig. 3 is a detail sectional elevation of a portion of a vehicle and the brake devices. Fig. 4 is a detail perspective view of an adjusting-cap used on a part of the device. Fig. 5 is a detail perspective view of a hand brake-lever adapted for use in operating the brake.

Similar numerals of reference are employed to indicate corresponding parts in the several views.

The numeral 1 designates a vehicle-body, which may be of any preferred form and of a nature applicable to any vehicle to which the brake mechanism may be connected. Extending transversely under the bottom of the body 1 is a brake-supporting rod 2, which is continuous and of a dimension to give it sufficient strength for its intended use. The said brake-supporting rod 2 is immovably held by opposite supporting-straps 3, which are bolted or otherwise fastened to the vehicle-body, and outside of the said supporting-straps the rod is extended downwardly at opposite ends to provide depending vertical bearings 4. The bearings 4 are of less diametrical extent than the rod 2, and by the reduction necessary to establish this difference in diameter upper shoulders 5 are formed on the downwardly-extended ends of the rod 2 at the upper commencement of the said bearings. The lower ends of the bearings 4 are screw-threaded, as at 6, for a short distance, and rotatably mounted thereon are sleeves 7, which are alike in every particular on both sides of the vehicle, and as a matter of convenience only one will be particularly described. From the upper inner portion of the sleeve 7 an elongated arm 8 extends under the bed 1 of the vehicle and has its inner terminal apertured. From the lower outer portion of the sleeve a short arm 9 projects and has its free end screw-threaded, as at 10. The sleeve 7 is held on the bearing 4 by a lower cap 11, which is run on the screw-threads 6, and, as shown by Fig. 4, said cap is formed with an apertured wing 12, for a purpose which will be presently described.

The brake-shoe 13 in the present instance has a central enlargement 14 at the rear, with a screw-threaded opening 15 extending transversely therethrough and adapted to be turned on the screw-threaded terminal 10 of the arm 9. This provides for adjusting the brake-shoe inward or outward relatively to the sleeve 7 when the conditions may require a change, and to hold the shoe in its desired adjusted position on the arm 9 a set-screw 16 is seated in the enlargement 14 and is adapted to have its inner end brought to bear against the screw-threaded terminal 10 of the arm 9. By loosening the set-screw 16 the shoe 13 may be adjusted at any angle that may be necessary to compensate for wear after long service or use or in initially arranging the parts relatively to a high or low level and in accord with the application of the brake mechanism to the vehicle.

The inner apertured ends of the arms 8 are pivotally attached to the rear terminals of diverging arms 17, extending rearwardly from a brake-operating rod 18, which, as shown more clearly in Fig. 1, runs forwardly under the central part of the vehicle and has a front upturned end 19, movably connected to a foot-operated brake-lever 20, having a fulcrum attachment 21 to a part of the front running-gear. The arms 17 are preferably formed as integral parts of the operating-rod 18 and have an inherent resiliency, so as to move toward or away from each other when the arms 8 are shifted rearwardly or forwardly in the operation of the brake-shoes.

To the axle 22, just inside of the inner termination of the wheel-hubs, clips 23 are secured, having forwardly-projecting ears 24, to which the rear arms 25 of turnbuckle-tubes 26 are movably attached. To each of the turnbuckle-tubes an adjusting-rod 27 is connected and has an angular or polygonal enlargement 28 thereon for the reception of a wrench or analogous implement, said rod being connected at its opposite end to a second turnbuckle-tube 29, having arms 30 movably attached to the wing 12 of the cap 11. The turnbuckle-tube 29 is in a reverse position to the similar tube 26, and the opposite ends of the adjusting-rod 27 have right and left screw-threads, whereby the length of exposed rod between the said turnbuckle-tubes may be increased or decreased and correspondingly affect the opposite brake-shoe-supporting devices or bearings. This adjusting means, having movable connection at opposite ends, respectively, with the axle and the brake-shoe-supporting devices or bearings, will serve to maintain a constant radial relation of the brake-shoes to the wheels with which they are intended to operate irrespective of the depressed or loaded condition of the vehicle-body. The tendency in similar devices heretofore presented has been to set up an irregular distance of the brake-shoes from the wheels when the vehicle-bodies lower or depress, owing to a slight longitudinal movement due to a shifting of the springs or after a time arising from a looseness of the connected part. With no means to hold the brake-shoes and their supporting devices in constant radial relation to the wheels it is difficult to bring the contact or impacting faces of the brake-shoes 12 against the wheel-tires, and the effectiveness of the brakes is materially impaired. By the provision of the adjusting-rods 27 these difficulties are overcome, and as a further assistance in obtaining a full pressure or engagement of the contacting faces of the brake-shoes with the wheels and as previously indicated the shoes in this instance are rotatable on the screw-threaded ends or terminals 10 of the arms 9, and the angle of adjustment can be positively sustained by the set-screws 16. Furthermore, the elevation of the brake-shoes can be governed and controlled relative to wheels of different diameters by varying the angles of the shoes on the arms 9, or, in other words, one brake mechanism, or that having definite proportions and dimensions, can be made to serve equally well with vehicles having wheels of large or small diameter by simply moving the brake-supporting rod nearer to or farther away from the wheels to be operated upon and without requiring an elongation or material variation of any of the devices comprised in the makeup of the brake mechanism.

By constant movement the sleeves 7 may become worn, and to adjust the same or take up the space that may be produced by such wear the caps 11 can be conveniently utilized by turning the same up on the lower screw-threaded ends of the bearings 4. A further advantage in the present construction is the continuous or rigid nature of the brake-supporting rod 2, having the opposite ends depending vertically, as set forth. Vehicle-bodies having a slight variation in cross-sectional extent could all have the same brake-supporting rod 2 connected thereto, and the difference in span between the wheels can be readily compensated for by adjusting the brake-shoes 13 on the screw-threaded terminals of the arms 9. This capability of the improved device will prevent or obviate the necessity of manufacturing a large number of brake mechanisms having only slight variations in dimension to accommodate the differences in vehicles and also adapt the brake mechanism to be easily disconnected from one vehicle and applied to another, as occasion may require.

In Fig. 5 a hand-lever mechanism is shown and can be connected up to the brake-operating rod 18. This hand-lever mechanism comprises a turn-rod 31, having rotatable bearing in suitable devices fixed to the under side of the forward part of the vehicle and extending in a transverse direction. At the inner end of the said turn-rod is a connecting-arm 32, adapted to be attached to the operating-rod 18, and in this arrangement the said latter rod will be shorter than shown when used in connection with the foot-lever 20. To the outer end of the turn-rod a shifting lever 33 is secured and has the usual dog 34 and operating devices therefor for evident purposes.

The present form of brake is sensitive in its operation and quickly responsive to the movements of either form of lever adapted to be attached or connected to the operating-rod 18. New brake-shoes 13 can be easily substituted for worn ones, and the several parts used in constructing the brake mechanism are few in number, and the cost of manufacture is therefore reduced to a minimum.

Other advantages will appear from time to time, and though the preferred form has been illustrated and descriptively disclosed it may be necessary at times to change the proportions, size, and details of construction, and such changes will be made as are within the scope of the invention.

Having thus described the invention, what is claimed as new is—

1. A brake mechanism for a vehicle, comprising brake-shoes, having a swinging movement in a horizontal plane and rotatably adjustable around the axes to vary the angle of contact of their faces, supporting parts for said shoes, and longitudinally-adjustable rods movably connected to said shoes and supporting parts and the axle of the vehicle to which the brake is applied, and having their rear ends pivoted to move in a vertical plane.

2. A brake mechanism for vehicles, comprising a supporting-rod having its opposite ends depending vertically and provided with bearings, sleeves rotatably mounted on the said bearings and having inner and outer arms at varying elevations, brake-shoes adjustably mounted on the outer arms of the sleeves, and an operating-rod attached to the inner arms of said sleeves.

3. A brake mechanism for vehicles, comprising a supporting-rod having vertically-depending bearings, sleeves rotatably mounted on the said bearings and provided with outwardly and inwardly extending arms at varying elevations, brake-shoes mounted on the outwardly-extending arms, and an operating-rod having diverging arms at its rear end attached to the inner ends of the inwardly-extending arms of said sleeves.

4. A brake mechanism for vehicles, comprising a supporting-rod having opposite vertically-depending ends provided with bearings, and lower terminal screw-threads, sleeves rotatably mounted on the said bearings and having outwardly-projecting short arms and inwardly-projecting longer arms, said arms being at different elevations, brake-shoes adjustably mounted on the said short arms, an operating-rod attached at its rear portion to the longer arms, caps removably fitted on the terminal screw-threads of the bearings, and adjustable rods movably connected to said caps and the axle of the vehicle.

5. A brake mechanism for vehicles, comprising a continuous supporting-rod having vertically-depending ends, sleeves rotatably mounted on the said depending ends of the supporting-rod and provided with outwardly and inwardly projecting arms, brake-shoes removably and adjustably attached to the outwardly-extending arms of the sleeves, and operating means movably connected to the inwardly-projecting arms of said sleeves.

In testimony that I claim the foregoing as my own I have hereto affixed my signature in the presence of two witnesses.

JOHN FERREL.

Witnesses:
  OSCAR B. NOTT,
  WILLIAM H. JOHNSON.